Patented Dec. 6, 1927.

1,651,770

UNITED STATES PATENT OFFICE.

MAX HARTMANN, OF BASEL, SWITZERLAND, ASSIGNOR TO SOCIETY OF CHEMICAL INDUSTRY IN BASLE, OF BASEL, SWITZERLAND, A FIRM.

MANUFACTURE OF PHYSIOLOGICALLY-ACTIVE SUBSTANCES FROM FEMALE INTERNAL SECRETORY ORGANS.

No Drawing. Application filed January 22, 1927, Serial No. 162,927, and in Switzerland February 2, 1926.

The present invention relates to a process for the manufacture of hormones from female internal secretory organs, and the object of the invention is to prepare such substances in a highly purified form.

According to this invention crude or more or less purified extracts from the female internal secretory organs, or distillates from such extracts, may be subjected to a saponifying treatment while retaining their activity, provided that the saponification is conducted with exclusion of oxygen. The saponification may be carried out by means of any alkali in water or in an organic solvent, the atmospheric air being displaced by an indifferent gas atmosphere, for instance one of hydrogen or nitrogen.

The following example illustrates the invention:—

1 part by weight of an extract from the ovary, obtained for example by dissolving the dry organ with ether, evaporating the solvent, treating the residue with four times its weight of acetone, filtering off the precipitate formed, cooling the filtrate with a mixture of ether and solid carbon dioxide to $-50$ to $-60°$ C., filtering the precipitate and evaporating the filtrate containing the active substance, is dissolved in 20 parts of alcohol. Into this solution, maintained in an atmosphere of hydrogen and warmed on the water-bath, there is dropped an alcoholic solution of potash until the liquid becomes permanently alkaline. Any excess of alkali is then neutralized by introducing carbon dioxide, the alcohol is evaporated in a vacuum and the residue is extracted with acetone. There remain undissolved the alkali soaps produced, while the active product passes into solution. It is obtained in the form of a bright oil by evaporating the acetone.

Having thus fully described my invention, what I claim as new and desire to secure by Letters Patent of the United States is:—

1. A process for obtaining physiologically highly active substances from female internal secretory organs, wherein an extract from such an organ is treated with a saponifying agent with exclusion of oxygen.

2. A process for obtaining physiologically highly active substances from female internal secretory organs, wherein a distilled extract from such an organ is treated with a saponifying agent with exclusion of oxygen.

In witness whereof I have hereunto signed my name this 8th day of January, 1927.

MAX HARTMANN.